US011488421B2

(12) United States Patent
Worden et al.

(10) Patent No.: US 11,488,421 B2
(45) Date of Patent: *Nov. 1, 2022

(54) SENSOR SIGNAL PROCESSING SYSTEM AND METHOD

(71) Applicant: Transportation IP Holdings, LLC, Norwalk, CT (US)

(72) Inventors: Bret Worden, Erie, PA (US); Jingjun Zhang, Lawrence Park, PA (US); David Peterson, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 306 days.

This patent is subject to a terminal disclaimer.

(21) Appl. No.: 16/733,723

(22) Filed: Jan. 3, 2020

(65) Prior Publication Data
US 2020/0143608 A1 May 7, 2020

Related U.S. Application Data

(63) Continuation of application No. 15/365,980, filed on Dec. 1, 2016, now Pat. No. 10,559,138.
(Continued)

(51) Int. Cl.
G01M 13/028 (2019.01)
G07C 3/00 (2006.01)
(Continued)

(52) U.S. Cl.
CPC .......... *G07C 5/008* (2013.01); *B61L 15/0081* (2013.01); *B61L 25/021* (2013.01);
(Continued)

(58) Field of Classification Search
CPC ....... G07C 5/008; G07C 5/004; G01F 23/263; G01M 13/028; G01M 17/007;
(Continued)

(56) References Cited

U.S. PATENT DOCUMENTS 10,559,138 B2 * 2/2020 Worden ................ G08C 17/02
11,333,501 B2 * 5/2022 Toda ....................... G01S 19/53
(Continued)

FOREIGN PATENT DOCUMENTS

EP 0018959 A 11/1980
JP H10206284 A 8/1998
(Continued)

OTHER PUBLICATIONS

Machine translation of JP2011245917A (Year: 2011).*
(Continued)

*Primary Examiner* — Robert T Nguyen
(74) *Attorney, Agent, or Firm* — Christopher R. Carroll; The Small Patent Law Group LLC

(57) ABSTRACT

A method includes generating movement signals indicative of sensed movement of a powered system in one or more directions and generating fluid level signals indicative of a sensed amount of fluid in the powered system. The method also includes, with one or more processors, receiving the movement signals and the fluid level signals from one or more accelerometers and a fluid level sensor, wherein the one or more processors also configured to filter at least some of the movement signals based on a speed at which the powered system operates. The method also includes, with a first antenna of the sensor assembly, wirelessly communicating one or more of the movement signals or the amount of fluid to a remote location.

20 Claims, 5 Drawing Sheets

Related U.S. Application Data

(60) Provisional application No. 62/269,315, filed on Dec. 18, 2015.

(51) Int. Cl.

| | | |
|---|---|---|
| *G07C 5/00* | (2006.01) | |
| *G07C 5/02* | (2006.01) | |
| *B61L 25/02* | (2006.01) | |
| *B61L 15/00* | (2006.01) | |
| *G01F 23/263* | (2022.01) | |
| *G08C 17/02* | (2006.01) | |

(52) U.S. Cl.
CPC ......... *G01F 23/263* (2013.01); *G01M 13/028* (2013.01); *G07C 3/00* (2013.01); *G07C 5/004* (2013.01); *G07C 5/02* (2013.01); *G08C 17/02* (2013.01); *G08C 2200/00* (2013.01)

(58) Field of Classification Search
CPC . G08C 17/02; G08C 2200/00; B61L 15/0081; B61L 25/021; G01D 21/02
See application file for complete search history.

(56) References Cited

U.S. PATENT DOCUMENTS

| | | | | |
|---|---|---|---|---|
| 2005/0222933 A1* | 10/2005 | Wesby | ............... | H04W 4/20 705/36 R |
| 2011/0202305 A1* | 8/2011 | Willis | ............... | G07C 5/085 702/141 |
| 2012/0025526 A1* | 2/2012 | Luo | ............... | F03D 15/10 702/34 |
| 2012/0025529 A1* | 2/2012 | Davis | ............... | F03D 80/70 702/179 |
| 2012/0046848 A1* | 2/2012 | Suwa | ............... | F01M 11/10 701/102 |
| 2013/0181829 A1* | 7/2013 | Schnitz | ............... | G06Q 20/203 340/539.1 |
| 2013/0304385 A1* | 11/2013 | Gillette, II | ............... | H01M 50/403 702/6 |
| 2015/0109142 A1* | 4/2015 | Mejegard | ............... | H04Q 9/00 340/870.07 |
| 2016/0241176 A1* | 8/2016 | Verma | ............... | H02P 9/102 |
| 2017/0063263 A1* | 3/2017 | Lee | ............... | H02P 23/14 |

FOREIGN PATENT DOCUMENTS

| | | | |
|---|---|---|---|
| JP | 2011245917 A | * | 12/2011 |
| WO | 2014163907 A1 | | 10/2014 |

OTHER PUBLICATIONS

Sheldon, J. S., Watson, M. J., & Byington, C. S. (2011). Integrating Oil Health and Vibration Diagnostics for Reliable Wind Turbine Health Predictions. vol. 1: Aircraft Engine; Ceramics; Coal, Biomass and Alternative Fuels; Wind Turbine Technology, doi: 10.1115/gt2011-46713 (Year: 2011) (Year: 2011).*

Extended European Search Report dated Dec. 23, 2021 for corresponding European Patent Application No. 21150209.1 (12 Pages).

2nd Office Action dated Mar. 31, 2020 for corresponding Chinese Patent Application No. 2016111670966.

English translation of the 2nd Office Action dated Mar. 31, 2020 for corresponding Chinese Patent Application No. 2016111670966.

Du Bin, "The Design for Tracking Filtering Circuit in Anti-aliasing Filtering of Machine Vibration Signal", Instrumentation, pp. 51-52, Jun. 2004.

European Search Report dated Aug. 11, 2021 for corresponding Application No. EP21150209.1 (12 Pages).

Examination Report dated Feb. 19, 2021 for corresponding Indian Patent Application No. 201644043177 (6 pages).

Accetta "Sensorless Control of PMSM Fractional Horsepower Drives by Signal Injection and Neural Adaptive-Band Filtering" 2011, IEEE Transactions on Industrial Electronics, vol. 59, No. 3, Mar. 2012, pp. 1355-1366 (12 pages).

Supplementary Search dated Jul. 10, 2020 for corresponding CN Application No. 201611167096.

\* cited by examiner

SENSOR SIGNAL PROCESSING SYSTEM AND METHOD

CROSS-REFERENCE TO RELATED APPLICATIONS

This application is a continuation of U.S. patent application Ser. No. 15/365,980, filed 1 Dec. 2016, which claims priority to U.S. Provisional Application No. 62/269,315, filed 18 Dec. 2015, each of which is incorporated herein by reference in its entirety. This application is related to U.S. patent application Ser. No. 14/421,245 (filed 12 Feb. 2015), Ser. No. 14/866,320 (filed 25 Sep. 2015), and Ser. No. 14/869,038 (filed 29 Sep. 2015), the entire disclosures of which are incorporated herein by reference.

FIELD

The subject matter described herein relates to systems and methods that use process information (e.g., data) provided by sensors, such as sensors disposed onboard vehicles.

BACKGROUND

Various systems can include sensors for monitoring characteristics of the systems and/or surroundings of the systems. For example, vehicle systems, stationary power systems, etc., can include several sensors monitoring the same or different characteristics. These sensors can monitor vibrations, temperatures, states, or the like, of the systems in order to track operation of the systems, identify unsafe conditions, determine when maintenance or repair of the systems are needed, or to achieve other objectives. The data provided by the sensors may be used for one or more purposes to control operation and/or monitor health of the vehicles.

BRIEF DESCRIPTION

In one embodiment, a sensor assembly includes one or more accelerometers configured to generate movement signals indicative of sensed movement of a powered system in one or more directions, a fluid level sensor configured to generate fluid level signals indicative of a sensed amount of fluid in the powered system, and one or more processors configured to receive the movement signals and the fluid level signals from the one or more accelerometers and the fluid level sensor. The one or more processors also are configured to one or more of filter at least some of the movement signals based on a speed at which the powered system operates or calculate one or more of statistical measure, a fast Fourier transform (FFT), or a discrete Fourier transform (DFT) of the movement signals. The assembly also includes a first antenna configured to wirelessly communicate the one or more of the movement signals, the amount of fluid, the statistical measure, the FFT, or the DFT to a remote location.

In one embodiment, a system includes a sensor configured to generate vibration signals indicative of senses vibrations of a vehicle, and one or more processors configured to one or more of: filter at least some of the vibration signals based on a speed at which a motor of the vehicle operates and communicate the vibration signals that are not filtered out of the sensor, or calculate one or more of statistical measure, a fast Fourier transform (FFT) or a discrete Fourier transform (DFT) of the vibration signals and communicate the one or more of the statistical measure, the FFT, or DFT out of the sensor.

In one embodiment, a method includes generating vibration signals representative of sensed vibrations of a vehicle using a sensor, and one or more of: filtering at least some of the vibration signals that are sensed based on a speed at which a motor and wheels of the vehicle operates and communicating the vibration signals that are not filtered out of the sensor, or calculating one or more of statistical measure, a fast Fourier transform (FFT), or a discrete Fourier transform (DFT) of the vibration signals and communicating the one or more of the statistical measure, the FFT, or DFT out of the sensor.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
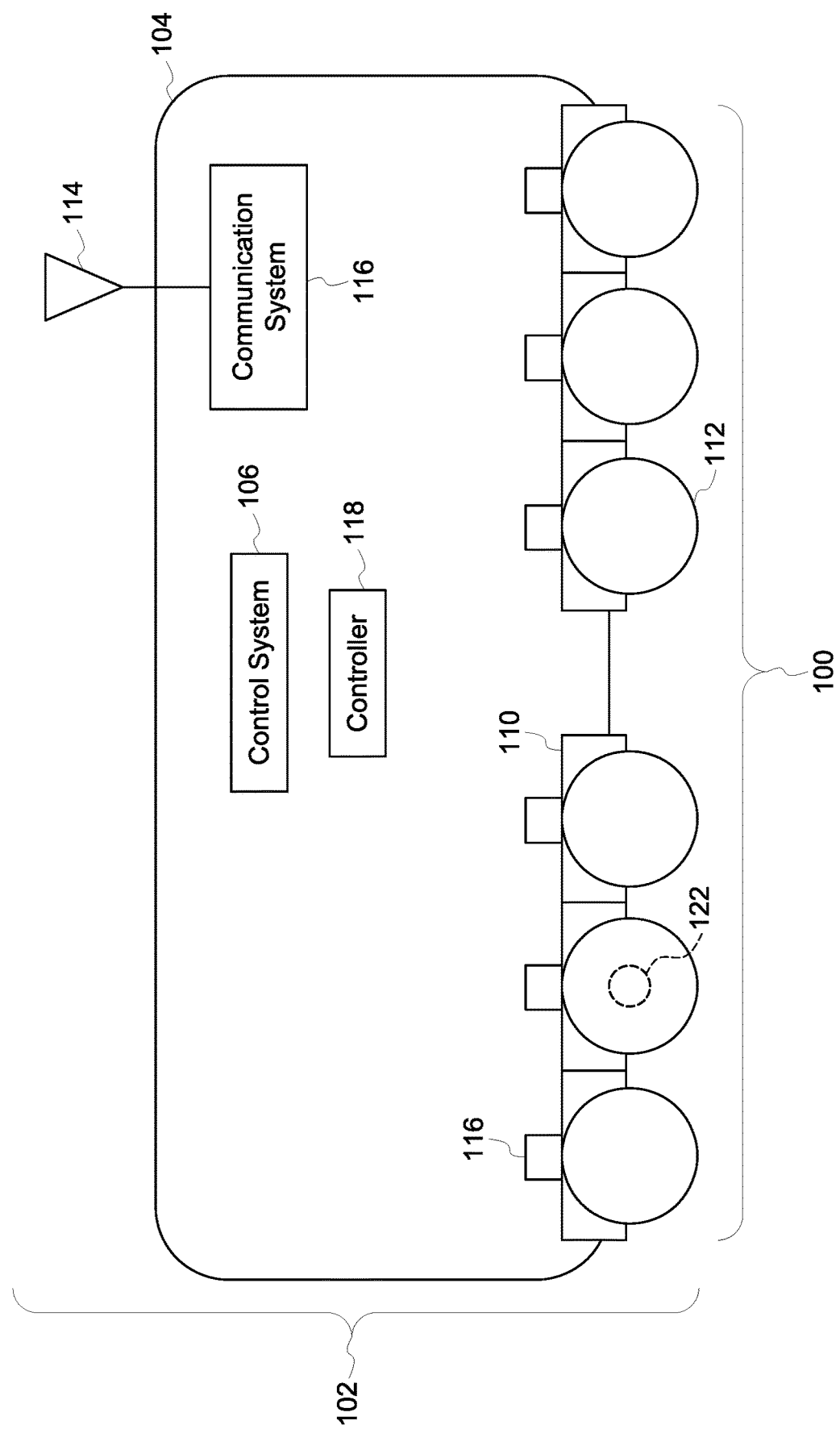
FIG. 1 illustrates a sensor system onboard a vehicle system according to one embodiment.

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to vehicle systems such as trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles (e.g., automobiles, trucks, etc.), each of which may include a vehicle consist. A vehicle system may be formed from two or more vehicles that communicate with each other to coordinate travel of the vehicle system, but that are not mechanically linked with each other. For example, a vehicle system may include two or more vehicles that wirelessly communicate with each other so that the different vehicles may change the respective speeds, tractive efforts, braking efforts, and the like, to cause the separate vehicles to travel together as a convoy or other group along the same route. Optionally, one or more embodiments of the systems and methods described herein may be used with other non-vehicular systems, such as stationary powered systems.

FIG. 1 illustrates a sensor system 100 onboard a vehicle system 102 according to one embodiment. The vehicle system 102 shown in FIG. 1 includes a single vehicle 104, but optionally may represent two or more vehicles that travel together along a route. The vehicles may be mechanically coupled with each other to travel together as a vehicle consist or may be mechanically decoupled but communicate with each other to coordinate movements of the vehicles and travel together as a convoy along the route. The vehicle can represent a propulsion-generating vehicle, such as a locomotive, automobile, marine vessel, or the like. Optionally, the vehicle can represent a non-propulsion-generating vehicle, such as a rail car, trailer, barge, or the like.

The components of the vehicle and/or sensor system may be operably connected by one or more wired and/or wireless connections. The vehicle includes a control system 106 that operates to control operations of the vehicle and/or vehicle system. The control system 106 can include or represent hardware circuitry that includes and/or is connected with one or more processors (e.g., microprocessors, field programmable gate arrays, integrated circuits, or other electronic logic-based devices). The control system 106 may receive signals from an input device 108, such as one or more throttles, pedals, buttons, switches, microphones, touchscreen, keyboards, or the like. An operator of the vehicle may actuate the input device to control operations, such as movement, of the vehicle via the control system.

In response to receiving the input from the operator, the control system may communicate signals to one or more components of the vehicle or vehicle system to implement the input. For example, the vehicle may include propulsion systems 110 having traction motors, gear boxes, axles 122, wheels 112, etc., that generate tractive effort or torque to rotate the axles and wheels of the vehicle to propel the vehicle system. The control system can communicate signals to the traction motors to control the torque generated by the traction motors, the speed at which the traction motors operate, etc., to control movement of the axles and wheels of the vehicle or vehicle system. In another example, the control system can communicate signals to brakes or other components to control operations of the vehicle or vehicle system.

Although not shown in FIG. 1, the vehicle can include an output device that provides output to an operator of the vehicle or the vehicle system, to an off-board location, or to one or more other components of the vehicle or vehicle system. The output device can represent a display, a touchscreen, a speaker, a wireless transceiver, etc. The output device can receive signals from the control system that direct the output device to present the output to the operator or other location. A communication system 116 represents hardware circuitry that communicates data signals with one or more locations or systems located off-board the vehicle. The communication system can include transceiving circuitry, such as one or more antennas 114, routers, modems, and the like, for communicating data signals.

The sensor system includes several sensors 116. The sensors can represent a variety of devices that monitor characteristics of the vehicle system and/or the environment around the vehicle system. For example, the sensors may include temperature sensors (e.g., sensors that output data representative of temperatures of the vehicles and/or environment, such as hot box detectors, infrared cameras, etc.), vibration sensors (e.g., sensors that output data representative of movement in one or more directions, such as accelerometers), pressure sensors (e.g., sensors that output data representative of fluid pressure, such as air pressure in tires of the vehicles, pressures of oil or other lubricants in gear boxes and/or engines, etc.), fluid sensors (e.g., sensors that output data representative of an oil or other fluid level, or how much fluid, oil or other lubricant is in gear boxes, engines, etc.), positioning sensors (e.g., sensors that output data representative of geographic or other locations, such as a global positioning system receiver), speed sensors (e.g., sensors that output data representative of how rapidly a vehicle is moving, how rapidly a wheel and/or axle is rotating, etc.), acoustic sensors (e.g., sensors that output data representative of sounds, such as microphones), optic sensors (e.g., sensors that output data representative of images and/or videos, such as cameras, infrared detectors), electromagnetic sensors (e.g., sensors that obtain and/or output data using electromagnetic waves, such as radio frequency identification interrogators or tags), etc. While the same reference number 116 is used to identify the sensors, the sensors 116 may represent different types of sensors.

The sensors may be operably connected with the gear boxes, traction motors, or the like, to monitor fluid levels. In one embodiment, the sensors may include fluid level sensors, such as one or more of the oil level sensors described in one or more of U.S. patent application Ser. Nos. 14/421,245; 14/866,320; or 14/869,038. Alternatively, the sensors shown in FIG. 1 may be one or more other types of sensors, such as sensors measuring an amount of fuel in a fuel tank, an amount of coolant in a cooling system, etc. The sensors communicate data representative of the characteristics being monitored by the sensors (e.g., capacitance of the lubricant, an amount of the lubricant, vibrations, location of the vehicle, etc.) to the control system. The control system may use the data for one or more purposes as described herein. The components of the vehicle system and/or sensor system may be operably connected by one or more conductive pathways (e.g., cables, wires, buses, etc.) and/or wireless connections to allow for communication between the components.

A controller 118 optionally may be included in the sensor system. The controller can represent hardware circuitry that includes and/or is connected with one or more processors (e.g., microprocessors, field programmable gate arrays, integrated circuits, or other electronic logic-based devices) that communicate with the sensors to receive the data from the sensors. The controller may be operably connected with the sensors to operate as a gateway for the sensors to communicate sensed data with the control system. The controller may communicate some or all of the data to the control system. The processing of data or other signals that are provided or output by the sensors as described herein may be performed by the controller, by the control system, and/or a combination of the controller and/or control system. In one embodiment, the controller may be disposed off-board of the vehicle and/or the vehicle system to perform the signal processing.

Figure 2:
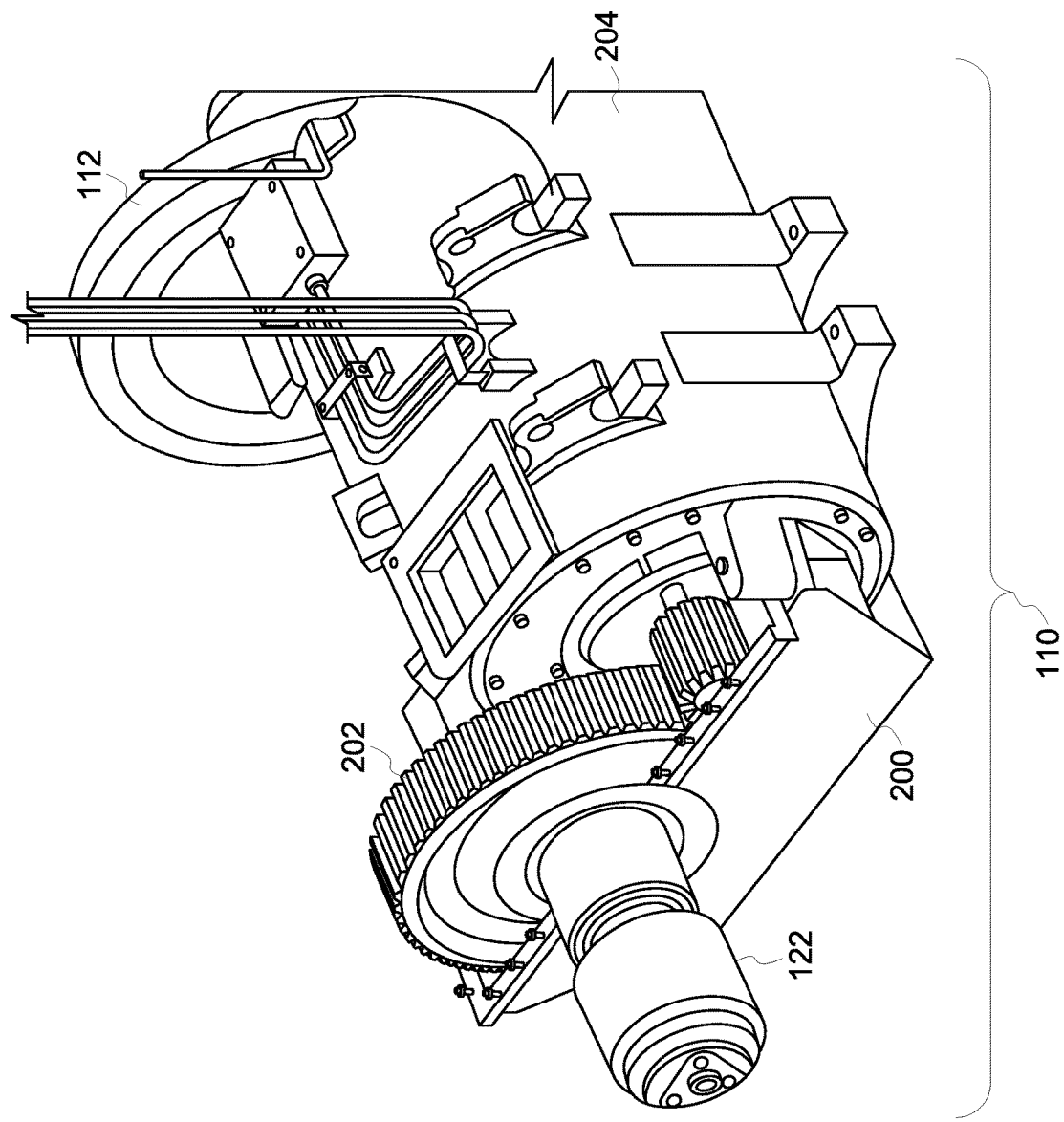
FIG. 2 illustrates one embodiment of a propulsion system in the vehicle shown in FIG. 1.

FIG. 2 illustrates one embodiment of one of the propulsion systems 110 in the vehicle 104 shown in FIG. 1. The propulsion system includes a gear box housing 200 in which one or more gears 202 connect a traction motor 204 with the axle 122. The axle 122 is connected with wheels 112 on opposite ends of the axle 122, although only a single wheel is shown in FIG. 2. The housing may hold a lubricant, such as oil, for lubricating gears and the like that interconnect a traction motor with an axle of the vehicle. The lubricant may be disposed within a lower portion of the housing, and the sensor 116 (shown in FIG. 1) may extend into the housing and at least partially into the lubricant inside the housing. The sensor can measure one or more characteristics of the lubricant, as described in one or more of U.S. patent application Ser. Nos. 14/421,245; 14/866,320; or 14/869,038. Additionally or alternatively, the same or another sensor may be connected with the propulsion system to measure vibrations, temperatures, or other characteristics of the propulsion system. Optionally, one or more of the sensors may be disposed onboard the vehicle, but not coupled with the propulsion system.

One or more of the sensors onboard the vehicle may sense vibrations. For example, one or more of the sensors may include an accelerometer that measures movements in one or more directions. Such a sensor may be disposed on the gear box housing, traction motor, or elsewhere to measure vibrations. The vibrations may be indicative of speeds or torques at which the traction motors operate (e.g., with one or more harmonic frequencies in a frequency domain representation of the vibrations indicating the motor speed), damage to the propulsion system (e.g., with peaks occurring at one or more frequencies in the frequency domain representation of the vibrations indicating damage to bearings, raceways, etc., of the motors), or the like. In one example, the sensors may include one or more of the sensor assemblies described in U.S. Provisional Application No. 62/269,265, filed 18 Dec. 2015, and titled "Vehicle Sensor Assembly And Method," the entire disclosure of which is incorporated herein by reference.

Optionally, one or more of the sensors onboard the vehicle may sense temperatures. For example, one or more of the sensors may include thermocouples or other temperature sensitive devices that measure temperatures of the gears, housing, motor, axles, etc. Such a sensor may be disposed on the gear box housing, traction motor, or elsewhere to measure temperatures. The temperatures may be indicative of damage to one or more components of the propulsion system. For example, elevated temperatures of an axle or temperatures of one axle that deviate from the temperatures of other axles in the same vehicle may indicate that the axle is damaged.

Figure 3:
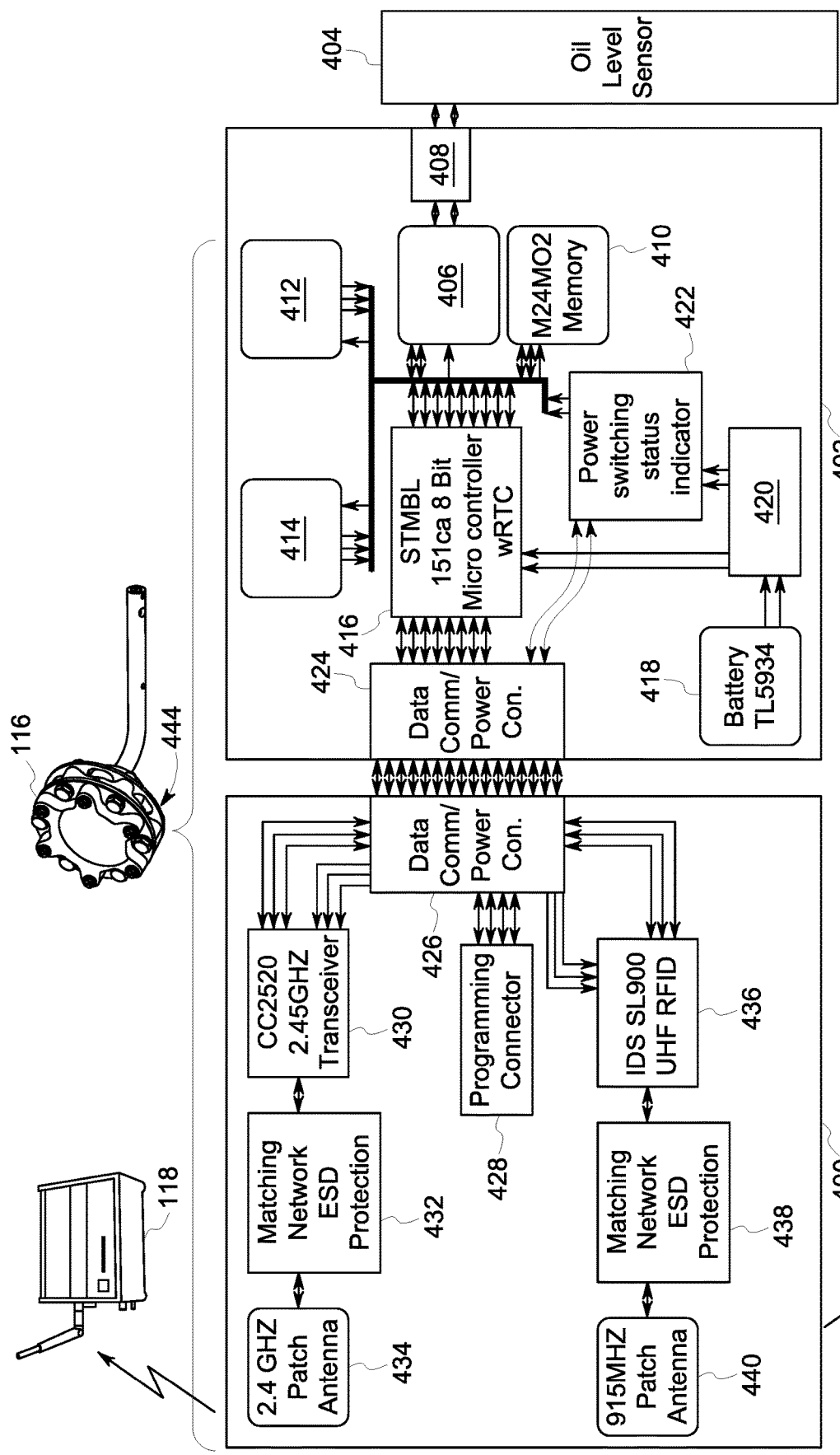
FIG. 3 illustrates a circuit diagram of a sensor shown in FIG. 1 according to one embodiment.

FIG. 3 illustrates a circuit diagram of at least one of the sensors 116 shown in FIG. 1 according to one embodiment. The sensor shown in FIG. 3 sensor represents one or more of the sensors described in U.S. patent application Ser. Nos. 14/421,245; 14/866,320; and/or 14/869,038. Alternatively, the sensor in FIG. 3 may represent another type of sensor. The sensor includes a housing 444 in which plural circuit boards 400, 402 with components connected with the circuit boards are disposed. Several sensing bodies (also referred to as sensors) 404, 412, 414 (e.g., "Oil Level Sensor," "2 g accelerometer," and "16 g accelerometer" in FIG. 3) represent components that are sensitive to one or more characteristics being monitored or measured by the sensor, such as a capacitive element configured to measure the capacitance of a fluid to determine how much fluid is present, accelerometers configured to measure movement, a thermocouple configured to measure temperature, etc. In the illustrated embodiment, the sensor 404 is a capacitive element configured to measure the capacitance of oil to determine how much oil is present and the sensors 412, 414 are accelerometers configured to measure movement in one or more different directions.

The sensing elements are operably connected with one or more processors 406 that sample the measurements made by the sensing element. The sensing element may be connected with processor 406 by an electrostatic discharge (ESD) protection device 408, such as a conductor having a dielectric and/or electromagnetic shield disposed around the conductor. The processor is connected with several other components, including a computer-readable memory 410 where the sampled measurements can be at least temporarily stored. A microcontroller 416 is operably connected with the processor and memory to control the transfer of data (e.g., measurements) to one or more other components. An onboard power source 418, such as a battery, can supply electric current to power the components of the sensor via a filter 420 ("Filter Capacitance Bank" in FIG. 3) and a switch 422 ("Power switching status indicator" in FIG. 3) that controls conduction of the current from the power source.

Communication interfaces 424, 426 represent connections between the circuit boards that allow communication of data between the boards. The communication interfaces can represent conductive busses, wires, or the like. A connector 428 ("Programming Connector") can couple with one or more other devices in order to communicate with the components of the sensor shown in FIG. 3. The data sampled by the sensor can be communicated out of the sensor via one or more divergent communication paths. One path wirelessly communicates the data to the controller 118 and includes a first transceiver 430, such as a 2.45 GHz transceiver or another type of transceiver. The first transceiver is operably connected with a first antenna 434, such as a 2.4 GHz patch antenna or another type of antenna, by an ESD protection device 432 ("Matching network ESD protection" in FIG. 3). The sensor 116 may wirelessly communicate the sensed data or characteristics to the controller 118 using the antenna 434 and transceiver 430. In another communication path, a radio frequency identification (RFID) transponder 436 ("IDS SL900 UHF RFID" in FIG. 3) is operably connected with the communication interface 426. Another ESD protection device 438 may be disposed between the transponder 436 and an antenna 440 ("915 MHz Patch Antenna" in FIG. 3). The transponder 436 and antenna 440 may be used to wirelessly communicate the data or measurements obtained by the sensor 116 to an interrogator device 442, such as an RFID reader. Alternatively, the antenna 440 may wirelessly communicate the data in another manner and/or to another device.

In one embodiment, the control system may use the vibrations measured by the sensors to determine health or damage states of the propulsion systems and/or to predict when the propulsion systems will fail or require repair or replacement. These sensors may include or represent hardware circuitry that includes and/or is connected with one or more processor (e.g., microprocessors, field programmable gate arrays, integrated circuits, or other electronic logic-based devices) that sample and process the measured vibrations for communication from the sensors to the controller and/or control system.

The propulsion systems include gears that mesh with each other and that also may vibrate during operation. The vibrations of the meshing gears may be detected by the sensors and communicated to the control system as measured vibrations of the propulsion system. In order to determine the health of or damage to a propulsion system (and/or to predict failure of a propulsion system), the controller and/or control system may remove the vibrations of the meshing gears from the vibrations measured by the sensors before performing analysis of the vibrations (e.g., to determine the health/damage state or predict failure of the propulsion system).

Figure 4:
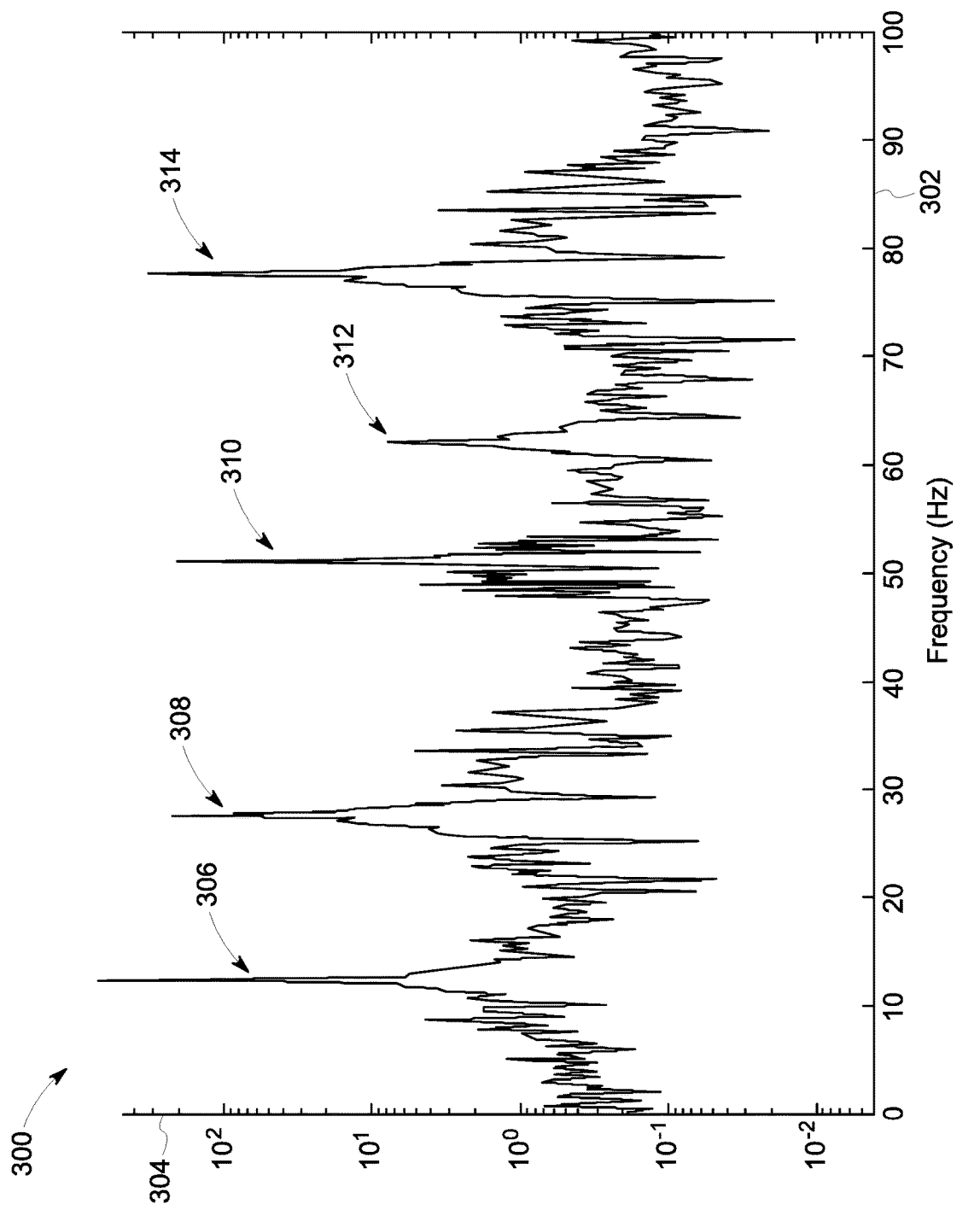
FIG. 4 illustrates a frequency signature of a propulsion system according to one example.

FIG. 4 illustrates a frequency signature 300 of a propulsion system according to one example. The frequency signature is a frequency domain representation of vibrations of the propulsion system as measured by one or more sensors. The frequency signature is shown alongside a horizontal axis 302 representative of frequencies of the vibrations and a vertical axis 304 representative of magnitudes of the vibrations. The frequency signature includes several peaks 306, 308, 310, 312, 314. The frequencies at which the peaks occur may represent operation and/or health of the propulsion system. For example, one peak may occur at a frequency indicative of the speed at which the traction motor of the propulsion system operates, another peak may occur at a frequency indicative of damage to a raceway, bearings, or the like, of the propulsion system, or other operations of the propulsion system.

In one embodiment, one or more of the peaks may represent a frequency at which meshed gears in the propulsion system are vibrating. For example, one peak may represent the speed at which the motor is operating, but the other peaks may represent vibrations of the gear mesh and/or damage to the propulsion system. In order to prevent the control system and/or controller from incorrectly identifying one or more of the gear mesh peaks being indicative of motor speed or health/damage state of the propulsion system, the controller and/or control system may receive movement signals and/or vibration signals indicative of movements and/or vibrations of the gears from one or more sensors, filter out one or more portions of the vibration signals and/or movement signals from the frequency signature that represent the vibrations or movements of the gears. Another method to determine wheel speed is directly from the vibration sensor itself for cases where the drive train exhibits vibrational spectra indicative of wheel speed such as is the case when a gear mesh is coupled to the wheel speed. For example, a frequency domain spectrum of measured vibrations may include one or more peaks. The frequency or frequencies at which the one or more peaks occur may be representative of the wheel speed. Larger frequencies may represent faster wheel speeds and smaller frequencies may represent slower wheel speeds. The wheels speeds may be determined directly from the vibration spectrum or spectra detected by the sensors.

The mesh vibrations may include a fundamental component associated with a rate at which teeth of the gears mesh with each other. Because the gears are rotated by the motor to rotate the axle, the rate at which the gear teeth mesh (e.g., the gear mesh rate) may be proportional to the axle speed, or the speed at which the axle rotates. The magnitude of the gear mesh vibrations may dominate the magnitudes of other vibrations of the propulsion system in conditions where the propulsion system is in a healthy state (e.g., not damaged) and in a damaged state. The use of fixed bandwidth analog or digital low pass filters to reject or remove the vibration signals indicative of mesh-related vibrations from the vibrations that are used to determine motor speed and/or the health/damage state of the propulsion system. But, because the frequencies at which the gear mesh vibrations occur may change (e.g., with changing motor speed), the fixed bandwidth filters may inadvertently remove frequencies and/or peaks that are not representative of gear mesh vibrations.

In one embodiment, the sensor (e.g., the processor 406), the controller, and/or control system may receive the vibrations measured by the sensors and apply a speed-proportional bandwidth filter to the vibration signals indicative of measured vibrations to remove some or all vibrations signals indicative of gear mesh vibrations from the vibration signals. The bandwidth filter may remove all vibration signals indicative of vibration frequencies appearing within the bandwidth or frequency range of the filter, which changes with changing axle speeds. For faster axle speeds, the bandwidth of the filter may increase so that a larger range of vibration signals indicative of a larger range of vibration frequencies are removed from the measured vibrations. For slower axle speeds, the bandwidth of the filter may decrease so that a smaller range of the vibration signals representative of a smaller range of vibration frequencies are removed. The axle speed information needed to program the filter can be provided to the sensor, the controller, and/or the control system wirelessly and/or can be measured directly by the sensor, controller, and/or control system (e.g., by identifying the largest peak in the frequency signature of the vibrations and determining the axle speed from that peak). Additionally or alternatively, the sensor, controller, and/or control system may apply a programmable digital filter to the vibration signals to remove the signals representative of gear mesh vibrations. This can be similar to using the speed-proportional bandwidth described above, with one difference being that the filter is implemented by a digital signal processor (DSP) or other processor to reject the gear mesh frequency or frequencies.

Additionally or alternatively, the sensor (e.g., the processor 406) may apply a fast Fourier transform (FFT) or discrete Fourier transform (DFT) to the vibration signals and communicate the transformed vibration signals to one or more components disposed off-board the sensor, such as the controller, the control system, the interrogator device 442, and/or a controller disposed off-board the vehicle and/or vehicle system. The component that receives the transformed vibration signals may be provided with the speed at which the vehicle is moving (e.g., from one or more of the sensors that represents a tachometer or from another source). This speed can be used to determine where the gear mesh frequencies are expected to be found, such as by examining harmonic frequencies of a fundamental harmonic frequency in the transformed vibration signals. The harmonic frequencies may represent gear mesh frequencies while the fundamental frequency can represent the speed of the vehicle. Other frequencies can represent the health/damage state of the propulsion system.

Some of the sensors may include processors 406 that sample the vibrations, but are unable to perform spectral analysis of the measured vibrations. The processors in the sensors may lack the ability to perform full spectral analyses of the vibration signals due to the relatively small form factors, cost limitations, or the like, of the sensors. These sensors may measure the vibrations in another manner, such as by measuring a quadratic mean or root-mean-square (RMS) of the sampled vibrations. A sensor can measure and calculate the RMS of vibration signals associated with multiple, different axes, such as the signals indicative of vibrations measured along three orthogonal axes (e.g., along the x-, y-, and z-axes). The sensor can sample the vibrations along the three different axes and communicate the vibration signals indicative of the measured vibrations along three different communication channels to one or more processors.

The accelerometer portion of the sensor may be capacitively coupled (e.g., coupled via capacitance) with the one or more processors, such as by an AC coupling. This coupling provides a high pass filter to the sampled vibrations along the different axes. The sampled vibrations along any or all of the different may be accumulated over a designated time period, such as 200 milliseconds (or another time period). For example, a vibration sampled along any axis during this time period may be squared, and an average of the squared samples acquired during this time period may be averaged. The square root of the average of the squared samples may be calculated for the time period. The value of the square root of the average of the squared samples may be used to represent the vibration measured by the sensor for the time period. Calculating the single vibration value for the time period can reduce the amount of data or information being handled by the sensor, and can reduce the processing needed to examine the vibrations measured by the sensor.

As described above, the sensor may use an onboard power source, such as one or more batteries, to power the components of the sensor. Because batteries are limited energy resources, the amount of energy that the sensor can use to measure, process, store, and/or communicate the data that is accumulated can be limited. The sensor may use a sampling strategy that employs a low duty cycle for measuring characteristics. Such a duty cycle can include a dominant sleep mode for the processor and other electronic components of the sensor, which the components being inactive during a majority of the time but periodically activating to record characteristics (e.g., temperature and/or vibration levels).

Due to the amount of data collected by the sensor and the processing complexity involved in examining the data to determine relevant information from the data, some sensors may the data off-board to another component for processing). The collection of data and subsequent communication of data can require seconds of data capture followed by several seconds of data communication. This process can significantly impact the lifetime of a battery within the sensor. By processing the data locally within the sensor (such as the processor 406 calculating RMS of vibration measurements, determining FFT or DFT of the vibration measurements, or the like), the communication times are significantly reduced. For example, instead of communicating a large amount of data over a longer time period, a smaller amount of processed data (e.g., the RMS values, the FFT or DFT of the sensed data, etc.) can be communicated out of the sensor over a shorter time period. The time required for communication (and for the battery to power the components that wirelessly communicate information from the sensor) may be reduced from several seconds to a fraction of a second. This can extend the lifetime of the battery from months to several years or longer.

Optionally, the system described herein may abort or not begin processing of the vibration or movement signals indicative of measured vibrations by one or more sensors if there are low levels of vibration or no vibration measured by the one or more sensors. For example, if a sensor measures no vibration or vibrations that are less than a designated threshold (e.g., less than 5%, less than 3%, less than 1%, or the like, of previously measured vibrations), the system may not examine or process the vibrations. This can save battery energy by not processing data that represents little, if any, vibrations.

Additionally or alternatively, the sensor may employ different wireless communication techniques to communicate data and reduce the amount of power consumption needed to power the sensor (e.g., relative to sensors that rely on a single type of wireless communication). As described above in connection with FIG. 3, the sensor may have plural different ways to communicate data. One technique for communicating data may be via a wireless channel or link using the antenna 434. In one embodiment, this communication may involve communicating data on an IEEE 802.15.4 wireless link, which may be a 2.5 GHz link. Another technique for communicating the data may be via a lower power RFID link established using the antenna 440, such as a 915 MHz link. The link established using the antenna 434 may be a primary mode of communication with a range of about 200 feet or another distance, such as a distance that is longer than the longest dimension of the vehicle on which the sensor is disposed.

The sensor may communicate data on the primary link on a predetermined schedule when the sensor wakes up or activates from a sleeping or inactive state. The time interval for this schedule may be customizable. As one example, this interval may be 1 hour or more to conserve battery power.

In one embodiment, the processor may be programmed to prevent the sensor from activating and communicating via the primary communication link during the interval (e.g., between times at which the sensor is activated). In order to allow the data to be obtained from the sensor during the inactive time periods of the sensor, the secondary communication link provided by the antenna 440 may provide a power, radio frequency (RF) communication link using a 915 MHz RFID antenna.

This secondary link can provide another way to communicate with the sensor during time periods that the sensor is not actively communicating using the primary communication link. The range of the secondary link may be limited, such as to a distance that is smaller than the longest dimension of the vehicle on which the sensor is disposed. For example, the range of the secondary link may be 15 feet or less. The antenna 440 used to establish the secondary link may be a passive antenna that is activated by interrogation of the antenna 440 with electromagnetic waves generated by the reader 442. The communication link activates the processor 406 using the externally excited antenna 440 and corresponding circuitry that communication with the sensor is possible even during times that the sensor is inactive. This allows for near instantaneous readings of data read by the sensor. In one example, the antenna 440 may receive signals that re-flash or update the firmware of the sensor, that alter or reset the communication parameters of the other communication link (e.g., by changing the activation interval), or the like.

Figure 5:
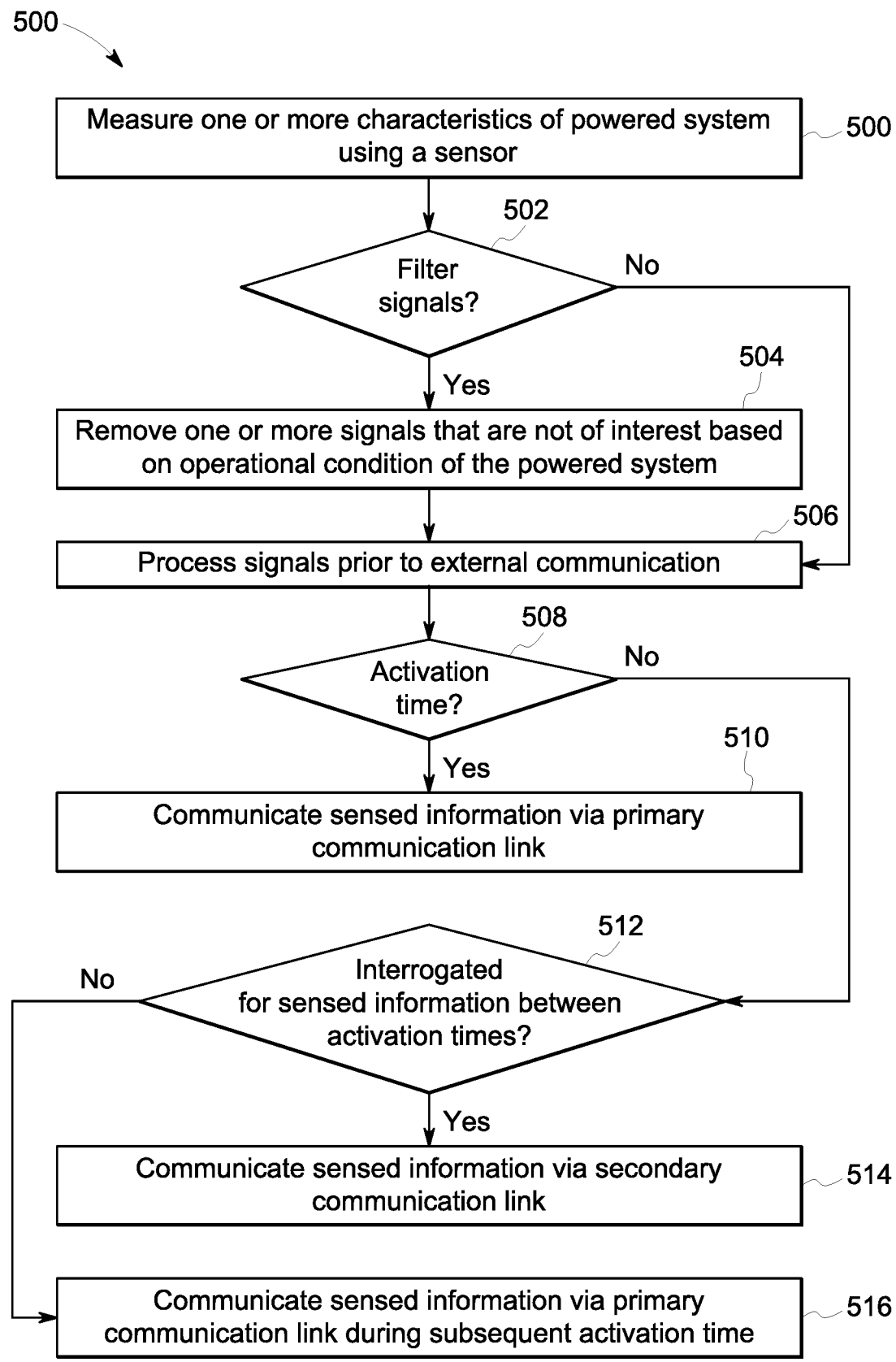
FIG. 5 illustrates a flowchart of one embodiment of a method for sensing, processing, and/or communicating data representative of characteristics of a powered system.

FIG. 5 illustrates a flowchart of one embodiment of a method 500 for sensing, processing, and/or communicating data representative of characteristics of a powered system. The method 500 may be performed by one or more embodiments of the sensor system described herein. The method 500 may be used to sense, process, and/or communicate data representative of powered systems such as vehicles, but not all embodiments are limited to vehicles. At 502, one or more characteristics of the powered system are sensed using a sensor. For example, vibrations, temperatures, fluid levels, or the like, may be sensed. At 504, a determination is made as to whether signals indicative of the characteristics that are sensed are to be filtered. For example, some signals may represent characteristics of interest (e.g., characteristics that can be examined in order to determine a health or failure state of the powered system) and other signals may not represent characteristics of interest (e.g., characteristics that, if examined, are not representative of the health or failure state of the powered system).

If any of the signals are to be filtered, then flow of the method 500 can proceed toward 504. At 504, signals indicative of one or more of the characteristics are filtered. For example, movement or vibration signals indicative of vibrations that are gear mesh vibrations may be removed from the signals representative of measured vibrations of a propulsion system. The movement or vibration signals may be removed using a filter, such as a filter having a bandwidth that varies based on an operating speed of the propulsion system or motor, a digital filter implemented by a processor, etc. If the characteristics are not to be filtered, then flow of the method 500 may proceed from 502 toward 506.

At 506, the signals indicative of the characteristics optionally can be processed prior to communicating the signals outside of the sensor. For example, in order to distinguish between characteristics of interest (e.g., vibrations of a traction motor) and characteristics that are not of interest (e.g., gear mesh vibrations), the sensor may determine an FFT or DFT of the signals indicative of the characteristics that are measured and communicate the FFT or DFT to an off-board location, where the FFT or DFT is examined. As another example, the sensor may calculate a statistical measure of the signals that are indicative of the characteristics of interest, such as an average, root mean square, or the like, for communication to an off-board location. This pre-communication processing can reduce the amount of time needed to communicate the information out of the sensor, which can extend the battery life of the sensor.

At 508, a determination is made as to whether an activation time has been reached. An activation time can occur at regular intervals. During the activation time, the sensor may activate, measure characteristics, and/or communicate the signals indicative of the characteristics or processed characteristics out of the sensor. If an activation time has been reached, then flow of the method 500 may proceed toward 510. At 510, the signals indicative of the information that has been sensed (e.g., the characteristics and/or processed characteristics) are communicated out of the sensor, such as via the primary communication link of the sensor described above.

If the activation time has not been reached, then the method 500 can proceed from 508 toward 512. For example, the current time may be between activation times, so the sensor does not communicate the signals indicative of the sensed information using the primary communication link. At 512, a determination is made as to whether the sensor has been interrogated for the sensed information between the activation times. For example, a determination may be made as to whether an RFID device is emitting electromagnetic waves to activate a secondary communication link of the sensor. If the sensor is being interrogated, then flow of the method 500 can proceed toward 514. Otherwise, the method 500 may proceed toward 516. At 514, the signals indicative of the sensed information are communicated out of the sensor via the secondary communication link. For example, the characteristics and/or processed characteristics can be wirelessly communicated via a RF signal by way of an RF connection. At 516, the signals indicative of the sensed information are communicated via the primary communication link during a subsequent activation time. For example, if the current time is not an activation time, then the sensor may wait until the next activation time or until the sensor is interrogated to communicate the characteristics or processed characteristics.

In one embodiment, a sensor assembly includes one or more accelerometers configured to generate movement signals indicative of sensed movement of a powered system in one or more directions, a fluid level sensor configured to generate fluid level signals indicative of a sensed amount of fluid in the powered system, and one or more processors configured to receive the movement signals and the fluid level signals from the one or more accelerometers and the fluid level sensor. The one or more processors also are configured to one or more of filter at least some of the movement signals based on a speed at which the powered system operates or calculate one or more of statistical measure, a fast Fourier transform (FFT), or a discrete Fourier transform (DFT) of the movement signals. The assembly also includes a first antenna configured to wirelessly communicate the one or more of the movement signals, the amount of fluid, the statistical measure, the FFT, or the DFT to a remote location.

Optionally, the assembly also can include a housing in which the one or more accelerometers, the fluid level sensor, the one or more processors, and the first antenna are disposed.

Optionally, the one or more processors are configured to filter the movement signals with a filter having a bandwidth that increases for faster speeds of a motor of the powered system and that decreases for slower speeds of the motor.

Optionally, the one or more processors are configured to calculate the statistical measure of the movement signals as a combination of movements of a propulsion system of the powered system in multiple, different directions.

Optionally, the one or more processors are configured to calculate the statistical measure as a root mean square of the movement signals of the propulsion system in the multiple, different directions over a sampling period.

Optionally, the first antenna is configured to wirelessly communicate the one or more of the movement signals, the amount of fluid, the statistical measure, the FFT, or the DFT to the remote location at regular intervals. The assembly optionally also can include a second antenna configured to wirelessly communicate the one or more of the movement signals, the amount of fluid, the statistical measure, the FFT, or the DFT to the remote location responsive to receipt of an interrogation signal from an external device.

Optionally, the first antenna is configured to communicate the one or more of the movement signals, the amount of fluid, the statistical measure, the FFT, or the DFT over a first communication link and the second antenna is configured to communicate the one or more of the movement signals, the amount of fluid, the statistical measure, the FFT, or the DFT over a different, second communication link, wherein the first communication link is a higher power and longer range communication link than the second communication link.

In one embodiment, a system includes a sensor configured to generate vibration signals indicative of senses vibrations of a vehicle, and one or more processors configured to one or more of: filter at least some of the vibration signals based on a speed at which a motor of the vehicle operates and communicate the vibration signals that are not filtered out of the sensor, or calculate one or more of statistical measure, a fast Fourier transform (FFT), or a discrete Fourier transform (DFT) of the vibration signals and communicate the one or more of the statistical measure, the FFT, or DFT out of the sensor.

Optionally, one or more processors are configured to filter the at least some of the vibration signals with a filter having a bandwidth that increases for faster speeds of the motor and that decreases for slower speeds of the motor.

Optionally, the one or more processors are configured to calculate the statistical measure of the vibration signals as a combination of movements of a propulsion system of the vehicle in multiple, different directions.

Optionally, the one or more processors are configured to calculate the statistical measure as a root mean square of the vibration signals of the propulsion system of the vehicle in the multiple, different directions over a sampling period.

Optionally, the one or more processors are configured to communicate one or more of the vibration signals, the statistical measure, the FFT, or the DFT at regular intervals via a first wireless communication link and to communicate the one or more of the vibration signals, the statistical measure, the FFT, or the DFT responsive to receipt of an interrogation signal from an external device via a different, second wireless communication link.

Optionally, the first wireless communication link is a higher power and longer range communication link than the second wireless communication link.

Optionally, the system also may include a transceiver and a first antenna configured to communicate the one or more of the vibration signals, the statistical measure, the FFT, or the DFT at the regular intervals over the first communication link at a designated frequency.

In one embodiment, a method includes generating vibration signals representative of sensed vibrations of a vehicle using a sensor, and one or more of: filtering at least some of the vibration signals that are sensed based on a speed at which a motor and wheels of the vehicle operates and communicating the vibration signals that are not filtered out of the sensor, or calculating one or more of statistical measure, a fast Fourier transform (FFT), or a discrete Fourier transform (DFT) of the vibration signals and communicating the one or more of the statistical measure, the FFT, or DFT out of the sensor.

Optionally, the method includes aborting the one or more of filtering or calculating responsive to the vibrations that are represented by the vibration signals being less than a designated, non-zero threshold.

Optionally, the method also can include determining the speed at which the wheels rotate based on the vibration signals.

Optionally, the method includes filtering the at least some of the vibration signals with a filter having a bandwidth that increases for faster speeds of the motor and that decreases for slower speeds of the motor.

Optionally, the method includes calculating the statistical measure of the vibration signals as a combination of movements of a propulsion system of the vehicle in multiple, different directions.

Optionally, the statistical measure is calculated as a root mean square of the vibration signals of the propulsion system of the vehicle in the multiple, different directions over a sampling period.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the clauses, and may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A method comprising:
generating movement signals indicative of sensed movement of a powered system in one or more directions with one or more accelerometers of a sensor assembly;
generating fluid level signals indicative of a sensed amount of fluid in the powered system with a fluid level sensor of the sensor assembly;
receiving the movement signals from the one or more accelerometers and the fluid level signals from the fluid level sensor using one or more processors of the sensor assembly;
filtering at least some of the movement signals based on a speed at which the powered system operates with the one or more processors; and
wirelessly communicating one or more of the movement signals or the amount of fluid to a remote location with a first antenna of the sensor assembly.

2. The method of claim 1, wherein the at least some of the movement signals are filtered using a filter having a bandwidth that changes based on the speed at which the powered system operates.

3. The method of claim 2, wherein the bandwidth of the filter increases for faster speeds of a motor of the powered system and decreases for slower speeds of the motor.

4. The method of claim 1, wherein the movement signals represent a combination of movements of a propulsion system of the powered system in multiple, different directions.

5. The method of claim 1, further comprising:
calculating a root mean square of the movement signals over a sampling period with the one or more processors.

6. The method of claim 1, further comprising:
wirelessly communicating the one or more of the movement signals or the amount of fluid with the first antenna to the remote location at regular intervals and wirelessly communicating the one or more of the movement signals or the amount of fluid with a second antenna to the remote location responsive to receipt of an interrogation signal from an external device.

7. The method of claim 6, wherein the one or more of the movement signals or the amount of fluid are communicated with the first antenna via a first communication link and the one or more of the movement signals or the amount of fluid are communicated with the second antenna via a different, second communication link.

8. The method of claim 7, wherein the first communication link is a higher power and longer range communication link than the second communication link.

9. A method comprising:
with one or more accelerometers of a sensor assembly, generating movement signals indicative of sensed movement of a powered system having a propulsion system with a motor in one or more directions;
with a fluid level sensor of the sensor assembly, generating fluid level signals indicative of a sensed amount of fluid in the powered system;
with one or more processors of the sensor assembly, receiving the movement signals and the fluid level signals from the one or more accelerometers and the fluid level sensor;
one or more of (a) filtering at least some of the movement signals with a filter having a bandwidth that increases for faster speeds of the motor of the powered system and that decreases for slower speeds of the motor or (b) calculating one or more of a fast Fourier transform (FFT) or a discrete Fourier transform (DFT) of the movement signals; and
with a first antenna of the sensor assembly, wirelessly communicating one or more of the movement signals, the amount of fluid, the FFT, or the DFT to a remote location.

10. The method of claim 9, further comprising:
filtering the at least some of the movement signals with the filter having the bandwidth that increases for the faster speeds of the motor of the powered system and that decreases for the slower speeds of the motor.

11. The method of claim 9, further comprising:
calculating the one or more of FFT or the DFT of the movement signals.

12. The method of claim 9, wherein the movement signals represent a combination of movements of the propulsion system of the powered system in multiple, different directions.

13. The method of claim 12, further comprising:
calculating a root mean square of the movement signals of the propulsion system in the multiple, different directions over a sampling period with the one or more processors.

14. The method of claim 9, further comprising:
wirelessly communicating the one or more of the movement signals, the amount of fluid, the FFT, or the DFT with the first antenna to the remote location at regular intervals and wirelessly communicating the one or more of the movement signals, the amount of fluid, the FFT, or the DFT with a second antenna to the remote location responsive to receipt of an interrogation signal from an external device.

15. The method of claim 14, wherein the one or more of the movement signals, the amount of fluid, the FFT, or the DFT are communicated with the first antenna via a first communication link and the one or more of the movement signals, the amount of fluid, the FFT, or the DFT are communicated with the second antenna via a different, second communication link.

16. The method of claim 15, wherein the first communication link is a higher power and longer range communication link than the second communication link.

17. A method comprising:
with one or more accelerometers of a sensor assembly, generating movement signals indicative of sensed movement of a powered system in one or more directions;
with a fluid level sensor of the sensor assembly, generating fluid level signals indicative of a sensed amount of fluid in the powered system;
with one or more processors of the sensor assembly, receiving the movement signals and the fluid level signals from the one or more accelerometers and the fluid level sensor;
one or more of (a) filtering at least some of the movement signals based on a speed at which the powered system operates or (b) calculating one or more of a fast Fourier transform (FFT) or a discrete Fourier transform (DFT) of the movement signals; and
with the first antenna, wirelessly communicating one or more of the movement signals, the amount of fluid, the FFT, or the DFT to the remote location at predetermined intervals, and, with a second antenna, wirelessly communicating one or more of the movement signals, the amount of fluid, the FFT, or the DFT to the remote location responsive to receipt of an interrogation signal from an external device.

18. The method of claim 17, wherein the movement signals represent a combination of movements of a propulsion system of the powered system in multiple, different directions.

19. The method of claim 18, further comprising:
calculating a root mean square of the movement signals of the propulsion system in the multiple, different directions over a sampling period with the one or more processors.

20. The method of claim 17, wherein the one or more of the movement signals, the amount of fluid, the FFT, or the DFT are communicated to the remote location via a higher power and longer range communication link and the one or more of the movement signals, the amount of fluid, the FFT, or the DFT are communicated to the remote location via a lower power and shorter range communication link.

* * * * *